United States Patent [19]

Shimada et al.

[11] Patent Number: 5,122,931
[45] Date of Patent: Jun. 16, 1992

[54] SOLID ELECTROLYTIC CAPACITOR AND A METHOD OF PRODUCING THE SAME

[75] Inventors: Akihiro Shimada; Yutaka Yokoyama; Susumu Ando, all of Tokyo, Japan

[73] Assignee: Nippon Chemi-Con Corporation, Tokyo, Japan

[21] Appl. No.: 634,000

[22] Filed: Dec. 26, 1990

[30] Foreign Application Priority Data

Dec. 27, 1989 [JP] Japan .................. 1-343538
Dec. 27, 1989 [JP] Japan .................. 1-343539

[51] Int. Cl.⁵ ............................................ H01G 9/00
[52] U.S. Cl. .................................................. 361/523
[58] Field of Search .......................... 361/523-525, 361/535-540, 275; 29/25.03

[56] References Cited

U.S. PATENT DOCUMENTS 3,675,086  7/1972  Wenzel .................. 361/523
4,696,082  9/1987  Fonfria et al. .......... 361/525
4,757,423  7/1988  Franklin ................. 361/275

Primary Examiner—Donald A. Griffin
Attorney, Agent, or Firm—Young & Thompson

[57] ABSTRACT

A chip type solid electrolytic capacitor comprises a plurality of anode plates on each of which an oxide thin layer, an electrolyte layer and a conductive layer are in turn formed, and a cathode plate interposed between the conductive layers of the plurality of anode plates when the anode plates are integratedly combined such that the respective conductive layers thereof are opposed to each other. Also, a method of producing the capacitor comprises the steps of forming layers on a plurality of anode plates, combining the anode plates, sealing a clearance between the anode plates with an insulating material, and bending a cathode plate and its terminal along an outer surface of the anode plate.

8 Claims, 5 Drawing Sheets

SOLID ELECTROLYTIC CAPACITOR AND A METHOD OF PRODUCING THE SAME

FIELD OF THE INVENTION

This invention relates to a solid electrolytic capacitor, particularly to an improvement in solid electrolytic capacitors of a chip type utilizing organic conductive compounds.

BACKGROUND OF THE INVENTION

Recently, chip type electronic parts have been developed in compliance with such requirements as miniaturization of electronic equipment and speedup in mounting onto a printed circuit board. Also, the development of a chip type electrolytic capacitor has been greatly demanded and thus various kinds of developments have been proposed.

However, in electrolytic capacitors, especially those using a liquid electrolyte, sealing of the liquid electrolyte in a given space is necessary. In general the sealing is achieved by placing a sealing substance made of elastic rubber onto an end-close cylindrical sheathing case including the capacitor elements.

In the case of miniaturization of the electrolytic capacitor with such a sealing structure, the sealing structure should be also miniaturized. In this case, the capacitor should be provided with a sealing means and a given space for placing the sealing substance in order to keep sufficient sealing effect, resulting in difficulty in the miniaturization of the capacitor. Accordingly, although various kinds of the chip type electrolytic capacitor have been developed for the miniaturization of an electrolytic capacitor body, the size of the capacitor is not less than about 4 mm to 10 mm in height from the printed circuit board. Therefore, it is extremely difficult to manufacture chip-type electrolytic capacitor of a size ranging from about 1 mm to 3 mm in height, which is substantially the same as that of a ceramic capacitor.

On the other hand, solid electrolytic capacitor using no liquid electrolyte generally comprise an anode plate made of a metal such as tantalum on which an oxide film layer is formed, a solid electrolyte layer made of a metal such as manganese dioxide which is formed on the anode plate, and a conductive layer made of carbon paste and silver paste or the like.

The thus-constituted solid electrolytic capacitor can be readily miniaturized in the chip-type form due to the solid electrolyte contained therein.

However, the capacity of a conventional solid electrolytic capacitor is limited to a range from about 0.1 to 10 microfarad. In addition, its impedance characteristic is superior to that of a capacitor using the liquid electrolyte but inferior to that of a ceramic capacitor. Moreover, if tantalum is used as the anode plate, the cost of manufacturing the capacitor becomes high.

In recent years solid electrolytic capacitor utilizing organic conductive compounds such as tetracyanoquinodimethane (TCNQ) and polypyrrole has been proposed. For instance, there are proposed solid electrolytic capacitors using polypyrrole as disclosed in the Japanese patent laid-open publications Nos. 63-158829, 63-173313, 1-228122, 1-232712, 1-251605, 1-243510, 1-260809 and 1-268111.

The solid electrolyte used for these solid electrolytic capacitors has higher conductivity than the conventional one consisting of metal oxide semiconductor. Therefore, such solid electrolytic capacitors have a high-frequency impedance characteristic and do not require sealing of liquid electrolyte in the capacitor body, so that the capacitors can be readily miniaturized.

However, the TCNQ complex is chemically unstable and specially inferior with respect to heat resistance. In some cases, an electrolyte layer of the TCNQ complex formed on an aluminum anode plate of the solid electrolytic capacitor deteriorates due to soldering heat ordinarily rising up to about 260° C. Accordingly, such a solid electrolytic capacitor is not suitable for use in a chip.

On the other hand, the solid electrolytic capacitor using polypyrrole as electrolyte has high heat resistance due to it polymer character and can be readily applied for use in a chip type capacitor.

The polypyrrole layer is produced on the surface of the anode plate by chemical, electrolytic and vapor-phase polymerizations and the like. The polypyrrole layer per se does not have a great mechanical strength, so that it is sometimes damaged due to such mechanical stress as torsion and pressing force exerted on the anode plate used as a substrate.

Upon surface-mounting onto the printed circuit board, ordinary chip-type electronic parts are delivered and placed thereon by a jig such as a suction nozzle. In this case, it is known that the parts are loaded with about 1 kg pressuring force of the suction nozzle. The ordinary electronic parts have on their surface a resin coating sufficiently resistant against the load of about 1 kg. On the other hand, the miniaturized electronic parts of a thin type have an electrolyte layer of polypyrrole which has less mechanical strength so that it is susceptible to damage by the pressing force of the suction nozzle.

In addition, since polypyrrole is characteristically deteriorated by moisture, a surface coating having an improved moisture resistance is required.

These disadvantages can be eliminated by applying a thick resin coating onto the surface of the electronic parts while forming a polypyrrole layer on a rigid anode block, as employed in the conventional solid electrolytic capacitor. However, in that case the miniaturization of the whole part, namely the manufacture of the part having substantially the same size as that of a ceramic capacitor, is not achieved.

SUMMARY OF THE INVENTION

It is therefore an object of the present invention to provide a chip-type solid electrolytic capacitor with a high fidelity which has sufficient rigidity and mechanical strength that a fragile electrolyte layer can be protected from mechanical stress upon mounting onto the printed circuit board.

The solid electrolytic capacitor according to the invention is characterized by a plurality of anode plates on each of which a thin oxide layer, an electrolyte layer and a conductive layer are in turn formed, and a cathode plate sandwiched between the conductive layers of adjacent anode plates when the anode plates are combined such that the respective conductive layers thereof face each other.

A second embodiment of the invention is characterized by a continuous projecting portion formed on the peripheral edge of at least one of a plurality of anode plates between which a cathode plate is interposed.

A third embodiment of the invention is characterized by a cathode plate interposed between anode plates, The cathode plate extends outward from a notched portion formed on a part of a projecting portion which is formed on the peripheral edge of the anode plate.

Further, a method of producing the solid electrolytic capacitor of the invention is characterized by the steps of forming in turn a thin oxide layer, an electrolyte layer and a conductive layer on one side surface of each of a plurality of anode plates, combining the anode plates such that the conductive layers thereof face each other and a cathode plate is interposed therebetween, sealing a clearance between the anode plates with an insulating material, and bending the cathode plate and its terminal previously derived from a notched portion of a projecting portion formed on the peripheral edge of the anode plate, along an outer surface of the anode plate.

As illustrated in the drawings, the capacitor of the invention has anode plates 1(a) and 1(b) on each of which a mechanically damageable electrolyte layer 3, for example a polypyrrole layer, is formed. The electrolyte layers 3 are opposed to each other and interposed between the anode plates 1(a) and 1(b), so that they can be protected from mechanical stress, ambient moisture and the like and provided with a thin layer of an outer resin coating 8 thereon. Therefore, the size of the capacitor can be miniaturized while the mechanical strength of the capacitor per se is increased.

A cathode plate 5 is sandwiched between the anode plates 1(a) and 1(b), resulting in stable connection between a conductive layer 4 and the cathode plate 5 and in simple structure of terminals. Furthermore, the electrolyte layers 3 are in contact with both side surfaces of the cathode layer 5 through the conductive layers 4, so that a large capacity of the capacitor is obtained.

The present invention will be more clearly understood from the following detailed description of various preferred embodiments of the invention taken with reference to the accompanying drawings.

PREFERRED EMBODIMENTS OF THE INVENTION

Figure 3:
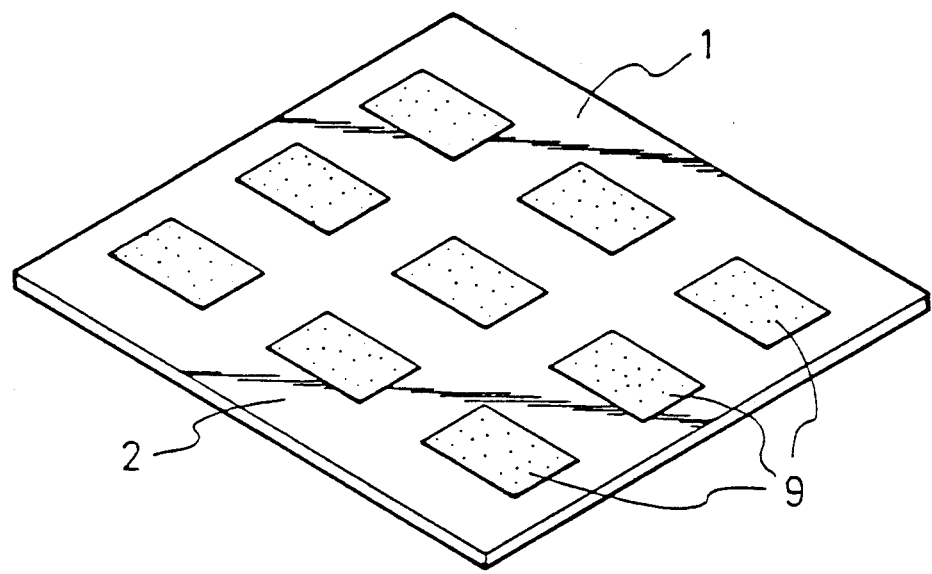
FIGS. 3 and 5 are perspective views illustrating a method of producing a solid electrolytic capacitor of the invention.
Figure 4A:
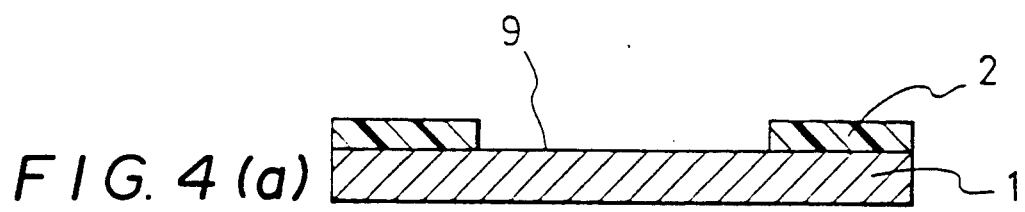
FIGS. 4(a), 4(b) and 4(c) are schematic views illustrating a process for forming an electrolyte layer during manufacturing the capacitor.
Figure 4B:
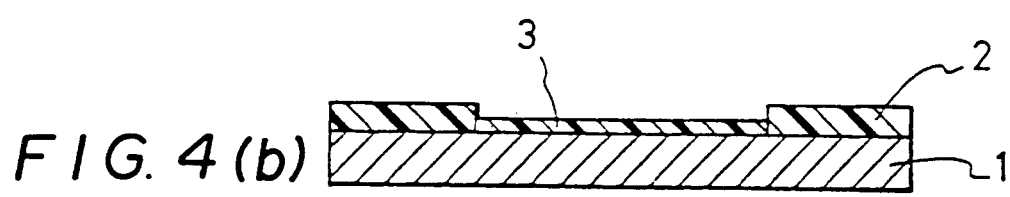

In the drawings, an anode plate 1 of aluminum or its alloy is formed in a sheet-like shape as illustrated in FIG. 3. Referring to FIG. 4(a), a resist layer 2 made of an insulating material is partially formed on one side surface 9 of the anode plate 1 by a screen printing method. Subsequently, a part of the anode plate surface 9, which is free of the resist layer 2, is subjected to a roughening processing in order to increase its surface area. On the surface 9 is then formed a dielectric oxide thin layer of aluminum oxide produced by electrolytic oxidation. The dielectric oxide thin layer is treated in a pyrrole solution containing an oxidizing agent to form a chemically polymerized pyrrole film layer thereon. Further, the anode plate 1 is immersed in an electrolytic solution in which pyrrole is dissolved. Then, a voltage is applied through the electrolytic solution to carry out an electrolytic polymerization of pyrrole. As a result, as illustrated in FIG. 4(b), on the surface 9 is formed an electrolyte layer 3 of polypyrrole which has a thickness ranging from few microns to several tens of microns.

Figure 4C:
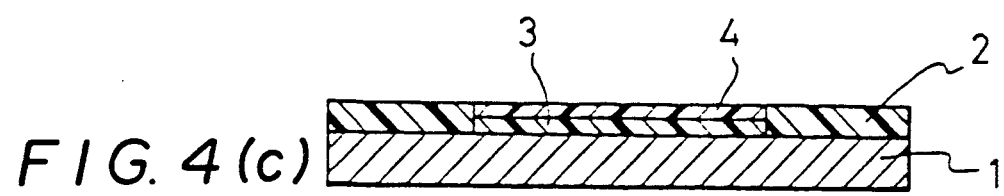

In addition, a conductive layer 4 is formed by screen printing on the electrolyte layer 3 as shown in FIG. 4(c). The conductive layer 4 is constituted by multiple layers made of a carbon paste and a silver paste or a single layer made of a conductive binder which contains a high-conductivity metal powder.

Figure 5:
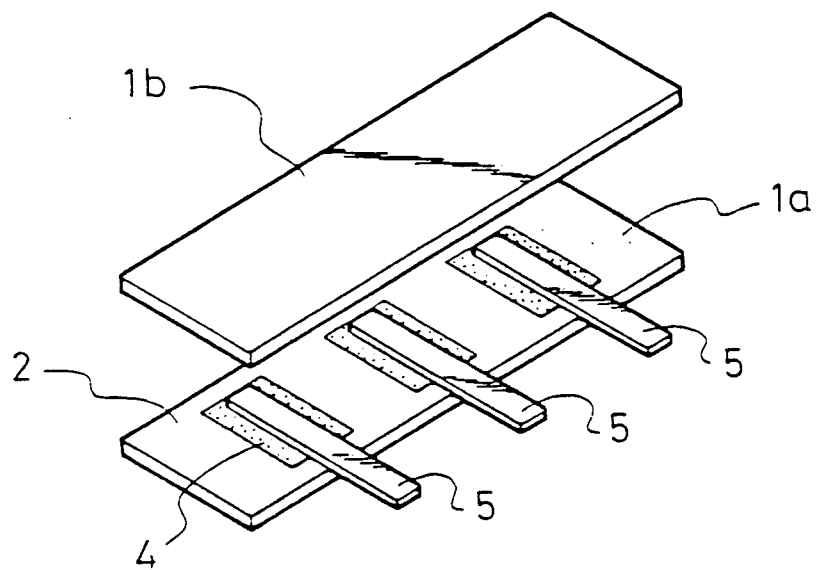

The anode plate 1 thus having on its surface the resist layer 2 selectively formed, the dielectric layer, the electrolyte layer 3 and the conductive layer 4, is cut into individual anode plate strips 1(a) as shown in FIG. 5, by a dicing saw, a high pressure water jet, a laser beam or the like. The combined layer formed of the electrolyte layer 3 and the conductive layer 4 as illustrated in FIG. 4(c) is provided on separate areas spaced apart from each other by the resist layer 2 on the anode plate strip 1(a). Subsequently, a cathode plate 5 made of a solderable metal such as copper is deposited on the conductive layer 4 arranged on the anode plate strip 1(a). In this case, a conductive binder may be applied onto a surface of the cathode plate 5 which is opposite to the conductive layer 4, in order to stabilize connection between the cathode plate 5 and the conductive layer 4.

Figure 1:
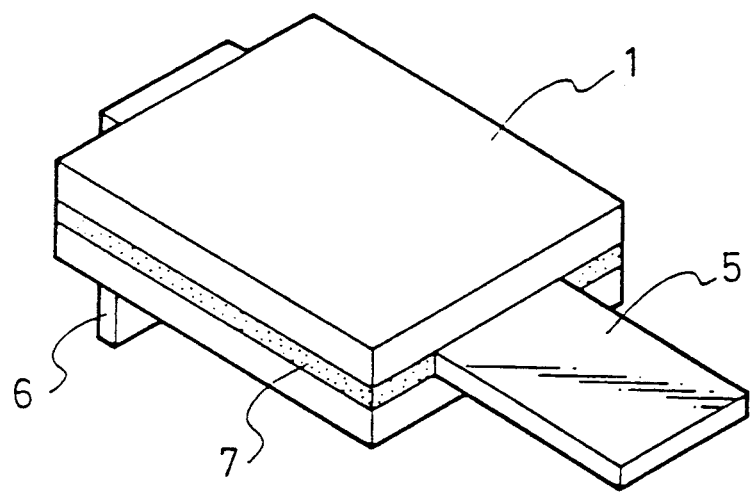
FIG. 1 is a perspective view of a solid electrolytic capacitor according to a first embodiment according to the invention.

In the same manner as used on the anode plate strip 1(a), another anode plate strip 1(b) is formed by cutting an anode plate having on one side surface thereof an oxide thin layer, an electrolyte layer and a conductive layer. A combination of these layers is provided on areas separated by a resist layer on the anode plate strip 1(b). The anode plate strip 1(b) is overlaid on the other anode plate strip 1(a) on which the cathode plate 5 is deposited, so that the conductive layers 4 of the anode plate strips 1(a) and 1(b) face each other through the cathode plate 5. Further, the overlaid anode plate strips are cut into a plurality of anode unit pieces each of which includes these layers 3 and 4 and the cathode plate 5 provided on the separate areas without the resist layer 2. An anode terminal 6 made of such a solderable metal as copper is attached by ultrasonic welding, laser welding and the like, to one end face of the individual anode unit pieces divided from the anode plate 1 comprising the anode plate strips 1(a) and 1(b). The cathode plate 5 extends from the other end face opposite to the end face with the anode terminal 6. Thus, a solid electrolytic capacitor as illustrated in FIG. 1 is manufactured.

Figure 6:
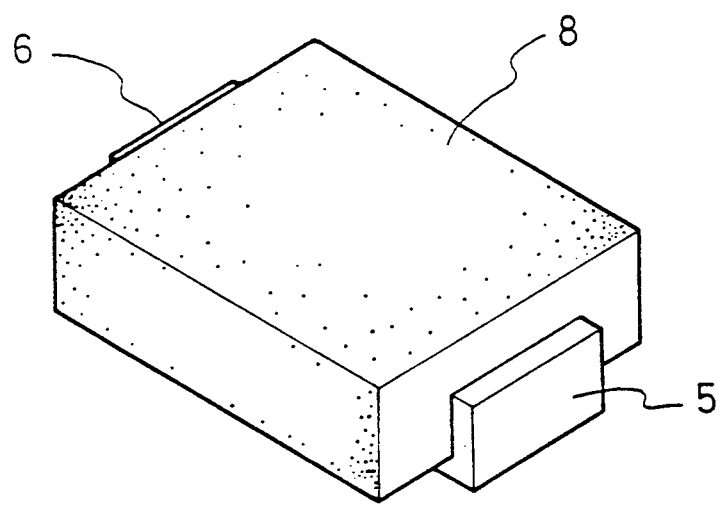
FIG. 6 is a perspective view of a solid electrolytic capacitor according to a second embodiment of according to the invention.

FIG. 6 depicts a second embodiment of the solid electrolytic capacitor according to the invention. The capacitor has a heat-curing outer resin coating 8 applied onto an anode plate 1, a cathode plate 5 extending from one end face of the anode plate 1 and an anode terminal 6 attached onto the other opposite end face of the anode plate 1. The cathode plate 5 is bent along the end face of the anode plate 1 on which the resin coating 8 is applied.

Figure 2:
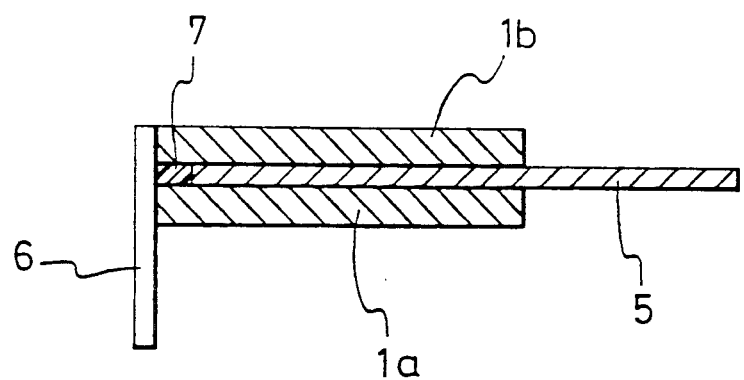
FIG. 2 is a sectional view of the capacitor of FIG. 1.

The cathode plate 5 of the solid electrolytic capacitor manufactured by the aforementioned method is sandwiched between the combined layers each comprising the conductive layer and the electrolyte layer as shown in FIG. 2. Therefore, connection between these capacitor elements is simplified and mass production of the capacitor is notably improved upon using the cathode plate 5 as a lead frame. In addition, it is not required to directly cover a connecting portion between the conductive layer and the cathode plate 5 with the resin coating as adopted in a conventional manufacture of the capacitor. Furthermore, differing from the conventional manufacturing process of the capacitor, the connection between the cathode plate 5 and its terminal is omitted. Accordingly, the anode plate 1 can be provided with the outer resin coating 8 by using molding or injection method as well as resin sealing such as potting. As a result, an indication of the polarities thereon is facilitated so as to realize high grade products while dimension accuracy in configuration is improved. Further, the resin coating process is simplified.

The electrolyte layer 3 of the solid electrolytic capacitor thus manufactured is sandwiched between the anode plates 1 so that mechanical stress is not directly exerted on the electrolyte layer 3 from the outside of the capacitor.

As illustrated in FIG. 1, for sealing of the electrolyte layer 3 per se, a sealing material 7 made of a resin, for example an epoxy resin, which is shieldable from exposure to air, is formed between a plurality of the anode plates 1. If the resin sealing material 7 is fixedly adhered to the anode plate 1, it is not necessary to cover a whole outer surface of the anode plate 1 with the outer resin coating 8 as shown in FIG. 6. To this end, the size of the capacitor can be further reduced as a whole.

Although the solderable metal such as copper is used singly as the cathode plate 5 in the above embodiments, a cladding material made of aluminum and the solderable metal such as copper may be also employed as the cathode plate. In addition, one side face of the cathode plate 5, particularly the face nearest to an end face of the anode plate 1, is coated with a resin so that an insulating layer is produced thereon. This configuration permits the cathode plate 5 to be bent along the end face of the anode plate 1 and then attached thereonto.

Figure 7:
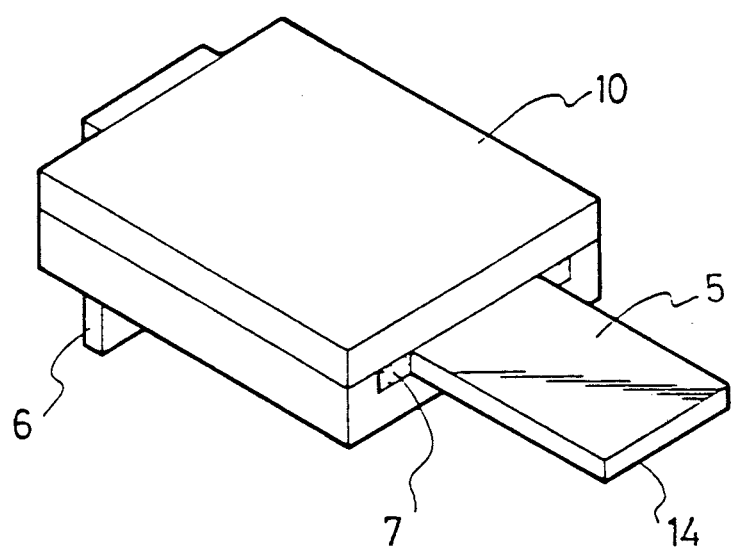
FIG. 7 is a perspective view of a solid electrolytic capacitor according to a third embodiment of according to the invention.
Figure 8:
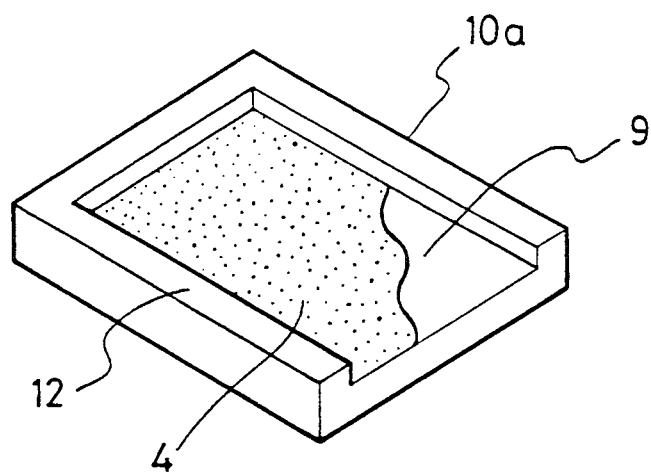
FIG. 8 is a perspective view of an anode plate of the capacitor of FIG. 7.

A third embodiment of the invention will be described hereinafter by referring to FIGS. 7 to 9. In FIG. 7, an anode plate 10 consists of anode plate frames 10(a) and 10(b) made of aluminum or its alloy. The anode plate frame 10(a) has a projecting portion 12 continuously formed along the peripheral edge of an anode plate surface 9 as illustrated in FIG. 8. The anode plate frame 10(a) is formed by pressing a surface of an aluminum plate or partially etching a predetermined portion of the surface.

The surface 9 surrounded by the projecting portion 12 of the anode plate frame 10(a) is subjected to a roughening processing in the same manner as employed in the first and second embodiments. Further, on the surface 9 are in turn formed a conductive layer 4, a thin oxide thin layer and a polypyrrole electrolyte layer having a thickness of a few microns to several tens of microns.

Figure 9:
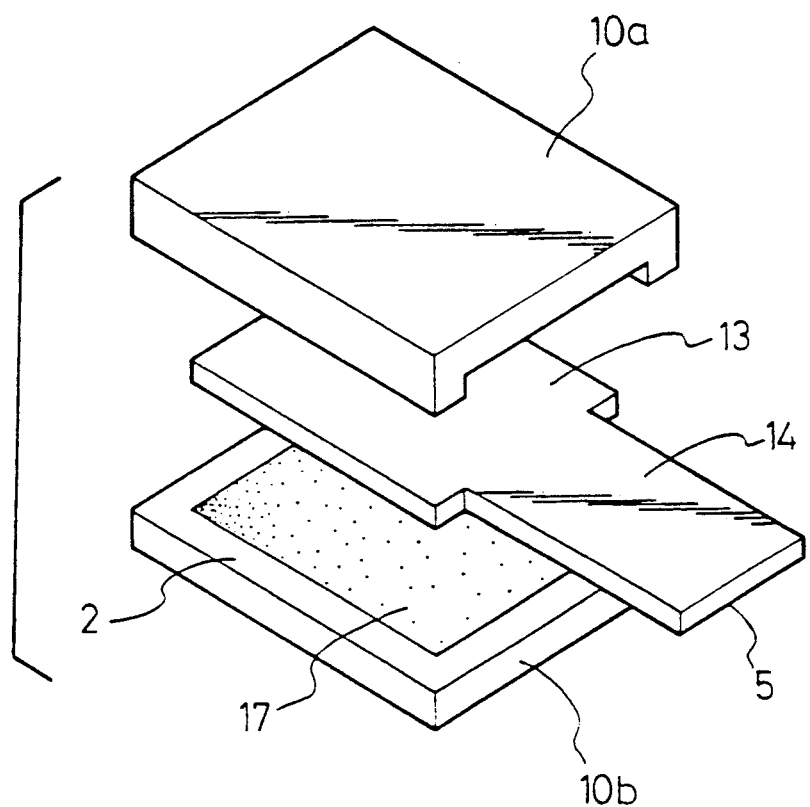
FIG. 9 is an exploded view of the components of the capacitor of FIG. 7.

The other anode plate frame 10(b) is formed from sheet-like material made of aluminum or its alloy and has on its one face a peripheral resist layer 2 made of an insulating material as illustrated in FIG. 9. The resist layer 2 is formed only on a predetermined portion of the frame 10(b). In the same manner as on the surface 9 of the anode plate frame 10(a), a thin oxide layer, an electrolyte layer and a conductive layer 17 are in turn formed on the portion of the frame 10(b) surrounded by the resist layer 2.

The cathode plate 5 is sandwiched between the anode plate frames 10(a) and 10(b) such that the conductive layers 4 and 17 of the respective frames 10(a) and 10(b) abut against each other. Thus, a solid electrolytic capacitor is manufactured as shown in FIG. 7.

In such a solid electrolytic capacitor, the electrolyte layer 3 is completely sealed so as to be protected from exposure to air, by forming the projecting portion 12 along the peripheral edge of the anode plate frame 10(a), and by applying a resin sealing material 7 such as a synthetic resin to a clearance created at an aperture of the capacitor from which a terminal 14 of the cathode plate 5 is derived.

Figure 10:
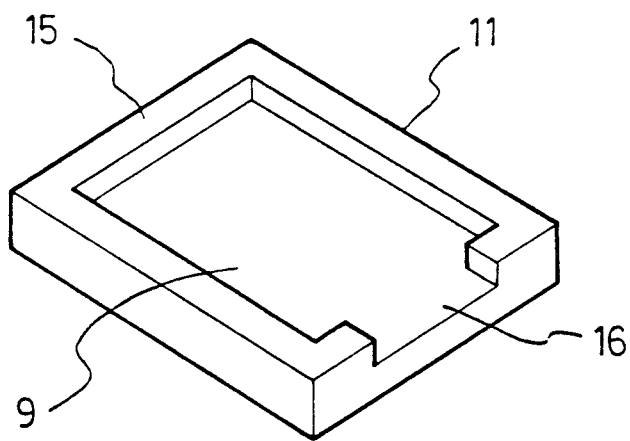
FIG. 10 is a perspective view of an anode plate used for a solid electrolytic capacitor according to a fourth embodiment of the invention.

A fourth embodiment will be now described hereinafter by referring to FIG. 10.

An anode plate 11 is attached to each of upper and lower side surfaces of a cathode plate (not shown in the drawing). The anode plate has a projecting portion 15 formed continuously along the peripheral edge thereof. The projecting portion 15 is partially provided with a notched portion 16. An oxide thin layer, an electrolyte layer and a conductive layer are in turn formed on a surface 9 of the anode plate 11 which is surrounded with the projecting portion 15. As shown in the first embodiment of the invention, the cathode plate (not shown in the drawing) is sandwiched between the anode plates 11 such that a terminal of the cathode plate extends from the notched portion 16 of the anode plate 11. The projecting portions 15 of the anode plates 11 are welded to each other by using such method as ultrasonic welding.

Since the projecting portion 15 is formed along the peripheral edge of each of the anode plates 11 provided on both upper and lower sides of the cathode plate and connected to the other projecting portion 15 by the ultrasonic welding and the like, the solid electrolytic capacitor thus manufactured has more excellent mechanical strength and sealing performance as compared with the capacitor of the aforementioned embodiments.

As is obvious from the above description, the solid electrolytic capacitor of this invention includes a cathode plate and a plurality of anode plates on which the oxide thin layer, the electrolyte layer and the conductive layer are in turn formed. The anode plates are attached to each other such that the conductive layer, the top of these layers formed on the anode plate, faces the one formed on the other anode plate. The cathode plate is sandwiched between the opposed conductive layers formed on the anode plates. The electrolyte layer is interposed between a plurality of the anode plates so that the electrolyte layer is protected by the anode plates from mechanical stress applied thereto from the outside of the capacitor. To this end, the electrolyte layer does not suffer from any damage, for example due to pressure of a suction nozzle during automatic mounting process. Accordingly, it is possible to obtain the solid electrolytic capacitor with high fidelity and considerably increase the capacity thereof by arranging the anode plates having the electrolyte layers thereon on both upper and lower sides of the cathode plate.

In addition, since the capacitor includes the anode plates made of such rigid metal as aluminum and fixed on both upper and lower sides thereof, dimension accuracy of the capacitor is notably improved. Therefore, printing of polarities and the like is facilitated while positioning of the printed marks becomes more precise and simplified upon automatic mounting of the capacitor onto a printed circuit board.

The cathode plate is allowed to contact the electrolyte layers through the conductive layers formed on the anode plates. Further, a part of the cathode plate extends outward from the aperture of the anode plate and is used as a terminal thereof. Thus the capacitor does not have any connection between inner lead wires and outer terminals which is required in the conventional capacitor, so that the capacitor is free from imperfect contact and other troubles.

A method of producing the capacitor of the invention is characterized by the steps of forming in turn a thin oxide thin layer, an electrolyte layer and a conductive layer on one side surface of an anode plate, attaching a plurality of the anode plates to each other such that the conductive layer on one anode plate is opposed to that on the other anode plate and a cathode plate is interposed between the opposed conductive layers, sealing a clearance created between the anode plates, bending a terminal of the cathode plate extending from the anode plate along an outer surface of the anode plate. Namely, since one anode plate on which the electrolyte layer is previously formed is attached to the other anode plate, the cathode plate is permitted to project outward while staying in contact with the conductive layers. Accordingly, the method of the invention dispenses with a process as conventionally employed for welding inner lead wires derived from a cathode electrode onto the electrolyte layer, resulting in simplification of the manufacturing process of the capacitor and minimization of damage to the electrolyte layer occurring in the manufacturing process.

The cathode plate sandwiched between the anode plates is brought into contact with the electrolyte layers through the conductive layers and partially extends outward. The extending portion of the cathode plate is not connected to any terminal for external connection but bent along the outer surface of the anode plate. Thus, a solid electrolytic capacitor suitable for mounting onto a printed circuit board is produced.

Furthermore, the capacitor of the invention is also characterized by a projecting portion continuously formed along the peripheral edge of at least one of a plurality of the anode plates placed on both upper and lower faces of the cathode plate. The anode plate having the projecting portion is considerably resistive against a mechanical stress exerted thereon. Therefore, the capacitor of the invention having such a structure of the anode plate has superior mechanical strength.

What is claimed is:

1. A solid electrolytic capacitor comprising a pair of rigid anode plates on one side surface of each of which an oxide thin layer, an electrolyte layer and a conductive layer are in turn formed, and a cathode plate interposed between the conductive layers of said plurality of anode plates when the anode plates are integratedly combined such that the respective conductive layers thereof are opposed to each other.

2. The solid electrolytic capacitor according to claim 1, wherein at least one of the pair of the anode plates placed on both sides of the cathode plate is provided with a continuous projecting portion on the peripheral edge thereof.

3. The solid electrolytic capacitor according to claim 2, wherein the cathode plate interposed between the conductive layers of the anode plates, extends outward from a notched portion formed on a part of the projecting portion of the anode plate.

4. A method of producing a solid electrolytic capacitor comprising the steps of:
   forming in turn an oxide thin layer, an electrolyte layer and a conductive layer on one side surface of each of pair of rigid anode plates;
   combining said pair of anode plates to form a capacitor unit such that the respective conductive layers thereof are opposed to each other, whereupon a cathode plate is interposed between the respective conductive layers;
   sealing a clearance between said anode plates with an insulating material; and
   bending said cathode plate and its terminal previously derived outward from a notched portion of a continuous projecting portion formed on the peripheral edge of said anode plate, along an outer surface of said anode plate.

5. An electrolytic capacitor comprising a first rigid anode plate having a first peripheral projecting portion defining a central recessed area, a layer of solid electrolyte material formed within the central recessed area and delimited by the peripheral projecting portion, a first layer of conductive material formed within the central recessed area and overlying the layer of solid electrolyte material, a cathode element overlying and contacting the first layer of conductive material, and a second rigid anode plate overlying and extending parallel to the first rigid anode plate and overlying the cathode element, said second rigid anode plate having formed thereon a second layer of conductive material contacting the cathode element.

6. The electrolytic capacitor according to claim 5, wherein the second rigid anode plate has a second peripheral projecting portion defining a central recessed area within which the second layer of conductive material is formed, the second peripheral projecting portion being in contact with and soldered to the first peripheral projecting portion of the first rigid anode plate, the first and second peripheral projecting portions thereby sealing the cathode element along at least three of its edges.

7. The electrolytic capacitor according to claim 5, wherein said cathode element has an integral connection portion extending laterally outwardly from the first and second rigid anode plates.

8. The electrolytic capacitor according to claim 7, wherein said first peripheral projecting portion comprises a notch having a width substantially equal to the width of the integral connection portion, the cathode element being fitted within the central recessed area of the first rigid anode plate and the integral connecting portion being received within said notch.

* * * * *